Oct. 9, 1928.
E. MOLNAR
1,687,256
SHADE FOR AUTOMOBILE HEADLIGHTS
Filed Jan. 20, 1928
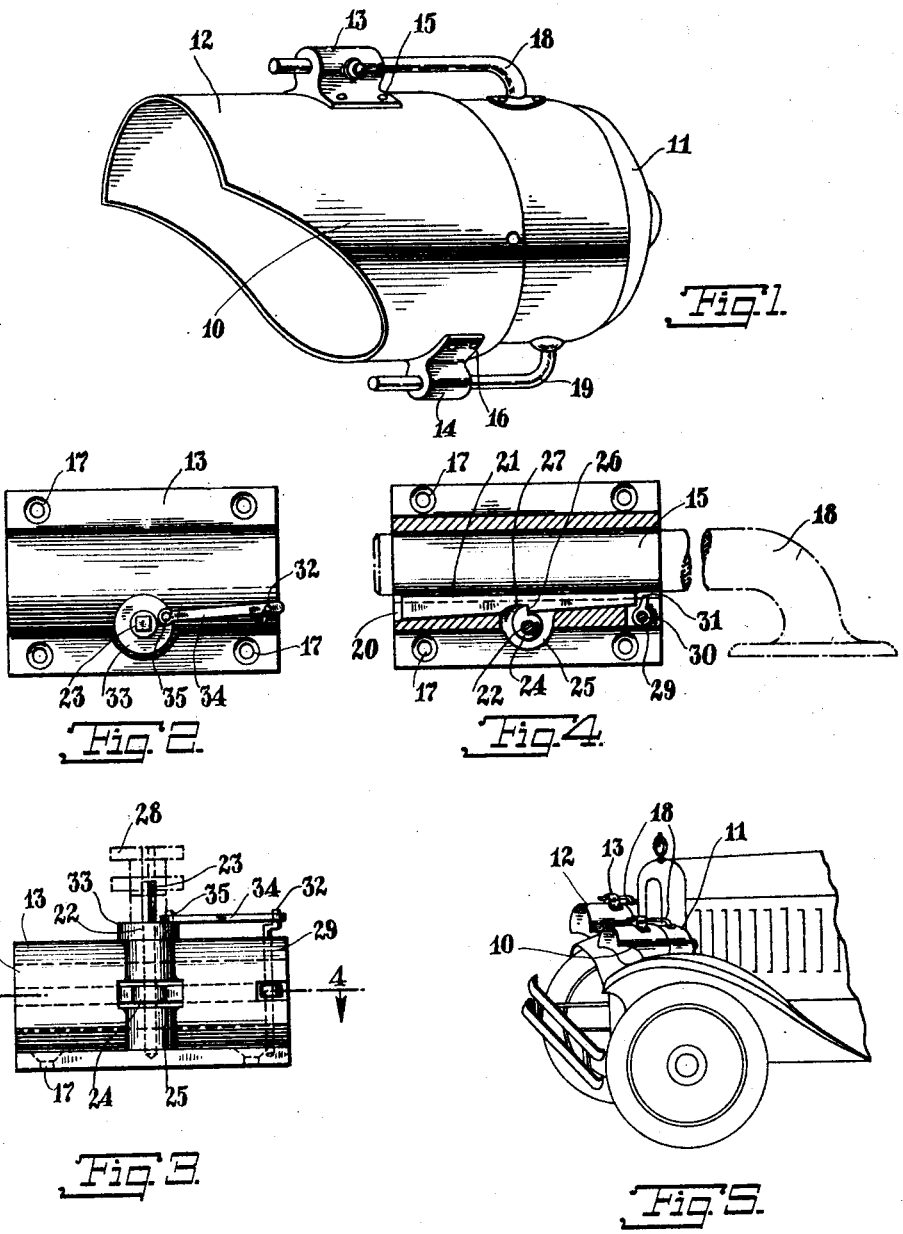
INVENTOR
Emery Molnar
BY
ATTORNEY Patented Oct. 9, 1928.

1,687,256

UNITED STATES PATENT OFFICE.

EMERY MOLNAR, OF FLEMINGTON, NEW JERSEY.

SHADE FOR AUTOMOBILE HEADLIGHTS.

Application filed January 20, 1928. Serial No. 248,081.

This invention relates to a new and useful device in the nature of an extensible shade for automobile head lamps especially adapted for the purpose of confining or concentrating the light rays from the said head lamp.

The object of the invention is to provide a shade embodying a means of readily attaching and detaching the said shade from the lamp of novel construction and arrangement of parts hereinafter more fully described, claimed and illustrated in the accompanying drawing.

Fig. 1 is a perspective view of my improved shade showing same attached to an automobile head lamp.

Fig. 2 is an enlarged top plan view of one of the clamping members as embodied in my improved device.

Fig. 3 is a side elevational view thereof.

Fig. 4 is a longitudinal sectional view taken on the line 4—4 of Fig. 3.

Fig. 5 is a fragmentary perspective view of an automobile equipped with my improved device.

As here embodied my improved extensible shade comprises a shade proper 10 preferably of sheet metal, reinforced in any desired manner and nickel plated, or enameled to match the enameling of the head lamp to which same is attached. The shade proper 10 is substantially of tubular construction adapted to freely engage of the outer member or shell of the head lamp 11, and is provided with an upper front extended portion 12, so as to form a visor or suitable shade.

Brackets 13 and 14 are secured as at 15 and 16 to the top and bottom of the shade proper 10 by rivets, screws, or the like. The brackets having formed therein suitable apertures 17 adapted to receive the said securing means. The brackets have formed therein longitudinal apertures 15, adapted to receive the prongs 18 and 19 secured to and extended from the shell of the head lamp 11.

The brackets 13 and 14 have formed therein elongated tapered slots 20, registering with the said apertures 15, adapted to slidably receive the clamp 21, positioned therein. The pins 22 are rotatably mounted in the brackets, transversely thereof, and are provided with upper extended elements 23 of square transverse section. The disc members 24 are secured intermediately to the pins 22, openings 25 are formed in the said brackets, adapted to receive the said discs. The discs 24 are provided with extended elements 26, adapted to engage in a notch 27 formed in the said keys 21. A knob 28, lever, handle or the like is provided with an aperture similar to the extended elements 23 of the pins 22, and is adapted to engage the said extended elements as a means of rotating the discs 26, in a clockwise direction, so as to permit the keys 21 to frictionally engage the prongs 18 and 19 as a means of securely holding my improved device in place in the head lamp.

The pins 29 are rotatively mounted in the brackets 13 and 14, transversely thereof, at or near the rear portion of the said brackets and have secured thereto, intermediately thereof a disc member 30 provided with an extended element 31. The pins 29 are extended somewhat above the said brackets and are provided with an offset or crank element 32. The disc member 33 is rotatively mounted on first mentioned pin 22, and is positioned directly above the said bracket. The link 34 is pivotally secured to the pin 35, eccentrically secured to and extended from the disc 33, and is pivotally secured to the crank element 32 of the pin 29.

The above described construction is such as will permit the knob 28 when fully engaged over the extended elements 23 of the pins 22 to engage or strike the link 34 adjacent to the pin 35, when the said knob is partially rotated in a counter clockwise direction, so as to cause the extended elements 31 of the disc members 30 to engage or strike the extremities of the keys 21, as a means of engaging the said pins from the prongs 18, so as to permit my improved shades to be readily detached from the said head lamps.

Having thus described my invention, what I claim as new and desire to protect by United States Letters Patent is:—

1. In a headlight comprising forwardly extended prongs, an extensible shade slidably mounted on said headlight, brackets on said shade having apertures therein through which said prongs extend, and a wedge shaped key in the aperture of each of said brackets between the inner side thereof and said prongs extending substantially the length of said brackets adapted to be driven rearwardly for frictionally holding said extensible shade on said headlight.

2. In a headlight comprising forwardly extended prongs, an extensible shade slidably mounted on said headlight, brackets on said shade having apertures therein through which said prongs extend, a wedge shaped key in the aperture of each of said brackets between the inner side thereof and said prongs extending substantially the length of said brackets adapted to be driven rearwardly for frictionally holding said extensible shade on said headlight, means for driving said keys rearwardly comprising a shaft rotatively journaled in said brackets, and a cam member thereon engageable in a notch in said key.

3. In a device of the class described, a headlight comprising forwardly directed prongs, a shade slidably mounted on said prongs comprising a bracket having an aperture therein for receiving the latter, a wedge shaped key disposed in said apertures adjacent said prongs, a shaft rotatively journaled in each of said brackets comprising an extension of square cross section, a disc on said shaft comprising a cam member engageable with a notch in said key, an outer disc journaled on said shaft comprising a pin, a crank shaft journaled in each of said brackets, a disc on each of said crank shafts comprising an extension adapted to engage the rear end of said key for driving the same forwardly, a link pivotally attached to said crank shaft at one end and to the pin of said outer disc at its other end and a handle member slidably mounted on the square extension of said first mentioned shaft adapted to be placed in one position for actuating said first mentioned shaft alone and to be placed in another position for engaging said pin to simultaneously actuate said first mentioned shaft and said crank shaft.

4. In a vehicle lamp comprising forwardly directed prongs, an extensible shade slidably mounted on the lamp, brackets on said shade each having an aperture therein for receiving said prongs, a key slidably mounted in said aperture, means comprising a shaft journaled in said brackets and a cam member thereon engageable with said key for driving the latter forwardly, means for driving said key rearwardly, and a handle on said shaft for selectively actuating said forward driving means and said rearward driving means.

In testimony whereof I have affixed my signature.

EMERY MOLNAR.